United States Patent [19]

Meckling

[11] 4,023,057
[45] May 10, 1977

[54] ELECTRIC MOTOR FIELD MAGNETS

[75] Inventor: John H. Meckling, Apopka, Fla.

[73] Assignee: Pacific Textile & Chemical Corporation, Altamonte Springs, Fla.

[22] Filed: Mar. 22, 1974

[21] Appl. No.: 453,685

[52] U.S. Cl. .................................. 310/154; 310/217
[51] Int. Cl.² ........................................ H02K 23/04
[58] Field of Search ............ 310/184, 185, 46, 186, 310/187, 188, 192, 193, 216, 154, 254, 258, 42, 43, 44, 45, 259, 156, 179, 217, 180, 218, 264; 335/303; 260/41 B, 2 M; 324/146

[56] References Cited

UNITED STATES PATENTS

| | | | |
|---|---|---|---|
| 747,698 | 12/1903 | Geisenhoner | 310/44 |
| 2,221,983 | 11/1940 | Mayer | 310/44 UX |
| 2,722,617 | 11/1955 | Cluwen | 310/154 |
| 3,010,041 | 11/1961 | Miller | 310/254 |
| 3,231,770 | 1/1966 | Hyde | 310/156 |
| 3,255,512 | 6/1966 | Lochner | 310/44 |
| 3,502,914 | 3/1970 | Cox | 310/254 |
| 3,691,130 | 9/1972 | Logvinenko | 260/41 B |
| 3,827,141 | 8/1974 | Hallerback | 310/254 |
| 3,872,334 | 3/1975 | Loubier | 310/43 |

Primary Examiner—R. Skudy
Attorney, Agent, or Firm—Roger L. Martin

[57] ABSTRACT

Compound magnets for motor stators have a laminated structure that includes thin, flexible magnets made from permanently magnetizable particles, such as barium ferrite, that are embedded in a flexible matrix, such as rubber. Various laminated arrangements are contemplated for producing more intense magnetic fields and thin metal spacers are used in most laminated structures to collapse the respective fields of the flexible magnetic components to increase the flux density at the resultant poles and to orient the permanent magnetic fields in the magnetic circuit of the motor. With edge polarized magnetic layers, an outwardly offset side edge arrangement for the spacers is used to among other things provide a pole piece for the motor as well as intensify the field. With facially polarized magnetic layers, the edges of the spacers are inwardly offset in the laminated structure. Various arrangements are shown to simplify construction costs and to establish focus field paths.

15 Claims, 20 Drawing Figures

ELECTRIC MOTOR FIELD MAGNETS

This invention relates to electric motors and more particularly to permanent field magnets for use in such motors.

Motors with field coils consume electrical energy to establish and maintain the magnetic field and are more expensive to operate than comparable motors that are equipped with permanent field magnets. Permanent field magnets have certain size limitations and inherent disadvantages that detract from their use in many motor applications. For one, the alnico and ferrous type metal magnets are expensive to manufacture and machine to the specific size requirements needed in many motor applications. Such magnets also have poor resistance to demagnetization, and, in industrial type motors that use such permanent field magnets, there is usually a need for special mountings in order to avoid physical shocks that adversely affect the magnetic properties of the permanent magnets. It is also well known that the use of such permanent magnets in electric motors is generally limited to low horsepower motor applications because field intensities that correspond to electromagnets used for high horsepowered motors are either unobtainable in such permanent magnets or can only be realized through the use of structures which are so large in size as to be impractical in use and exorbitant in manufacturing costs.

The use of flexible permanent magnets has become common in various areas of application during recent years. Such permanent magnets are made by embedding particles of a magnetizable material, such as barium ferrite, alnico, or other suitably magnetizable material, in a flexible matrix that permits the magnets to be bent and flexed. The matrix is usually composed of rubber or some synthetic polymerized material which upon curing provides the suitable flexible matrix. The particles of magnetizable material are oriented in a strong magnetic field during the polymerization and/or curing of the matrix material during the manufacture of such flexible magnets. In most cases, the form of the flexible magnet is obtained by extrusion techniques that are also carried out during the polymerization and curing process.

The use of flexible magnets having permanently magnetized materials as field magnets for electric motors has been suggested because such magnets have a high resistance to demagnetization from mechanical shock and are easy to machine. However, the magnetic characteristics of the flexible magnets are lower than those of the conventional ferrite and alnico type metal magnets so that the use of the former in the manufacture of motor field magnets has heretofore been considered prohibitive.

A general object of the invention has been to provide improved field magnet structures for motors. One particular object has been to provide field magnet structures that performance wise are comparable in many applications to permanent field magnets made from alnico but which are more economical to manufacture and embody in electrical motor structures. Another object of the invention has been to provide improved permanently magnetized structures for electric motors that during use are subjected to shocks and other vibrational forces that normally cause rapid decay in the magnetic properties of the more conventional permanent magnets employed in such motors. One particular object has been to provide improved field magnetic structures for motors through the use of flexible magnets which have a relatively high coercive force but relatively low residual induction as compared to the more conventional permanent field magnets, made as for example from alnico, and which are capable of embodiment in motors having performance characteristics comparable to conventional motors of the permanent field type. One particular object of the invention has been to provide economical and practical field magnet structures for DC motors and which may be employed in motors that are used for powering vehicles to, among other things, avoid the energy costs that are associated with the operation of motors of similar size but which use electromagnetic field producing components.

The field magnets in accord with the invention are compound magnets that have a laminated structure which includes thin layers or laminations which are assembled in a face-to-face arrangement. Included among the layers of the laminated structures of the compound magnets are thin, flexible layers that have permanently magnetized particles which are embedded in a matrix of flexible material. These flexible layers having permanently magnetized particles embedded in the flexible matrix will frequently be referred to herein as "flexible magnets" and as "flexible magnetic components", and these expressions should be understood as contemplating those flexible structures that have permanently magnetized particles which are embedded in a matrix of flexible material. The particles are preferably barium ferrite particles although particles of other magnetizable materials may be used in the manufacture of such magnets including the magnetizable ferrous and nickel alloys as well as others well known in the art. The matrix in such flexible magnets may be formed from a suitable natural or synthetic rubber or from suitable polymerizable natural or synthetic materials well known in the art and which provide the desired flexible matrix structure.

The invention contemplates the use of a plurality of thin, and preferably flat, sheet-like flexible magnets tht are oriented in a face-to-face arrangement in the laminated structure. These flexible magnetic components of the laminated structures are edge polarized in accord with certain aspects of the invention while in accord with other aspects of the invention, the flexible magnetic components are facially polarized as will be subsequently seen. In general the flexible magnets embodied in the compound magnetic structures hereinafter described have a thickness dimension which is usually less than about one fourth of an inch. Such thin structured magnets have been found to exhibit higher residual induction characteristics than thicker structured magnets of the same material when permanently magnetized in comparable magnetic fields.

In the preferred arrangements, as will be subsequently seen, thin, flexible magnets in the laminated compound magnet structures are spaced apart by thin metal spacers of highly permeable ferromagnetic material such as steel, iron or other suitable ferromagnetic material. These spacers have a higher permeability than that of the flexible magnets and serve in the laminated structures to collapse and advantageously orient the magnetic field associated with the flexible magnetic components of the laminated structure. Certain aspects of the invention, as will be subsequently seen, involve special orientations for the laminated structures in the assembled motors, as well as special edge arrangements for the layers or laminations involved in the compound magnetic structures.

The novel features which are believed to be characteristic of this invention are set forth with particularity in the appended claims. The invention itself, however, both as to its organization and method of operation, together with further objects and dvantages thereof, may best be understood by reference to the following description taken in connection with the accompanying drawings, in which:

FIGS. 4–6 illustrate another embodiment of the invention with

FIGS. 7–9 illustrate another embodiment of the invention with

FIGS. 10–12 illustrate another embodiment of the invention with

FIGS. 13–15 illustrate yet another embodiment of the invention with

FIGS. 16—18 illustrate yet another embodiment of the invention with

The compound magnets embodying the principles of the invention are made from flexible magnetic components that are assembled in a laminated strucute. These flexible magnets or magnetic components have magnetized particles of magnetic material which are embedded in a flexible matrix that provides the desired flexibility to the components. As previously indicated, the magnetizable particles may comprise various magnetizable materials such a particles of alnico, barium ferrite and other magnetizable ferrous and/or nickel materials well known in the art. In the preferred practice of the invention, the particles are of barium ferrite. As for the matrix material, the matrix may be made for suitable materials that upon curing and/or polymerization provide the desired flexible qualities such as rubber, or one or more of the polymerized synthetic material that may be heat and/or catalytically cured to provide the desired flexible matrix.

Figures 1, 2, 3, 19, 20:
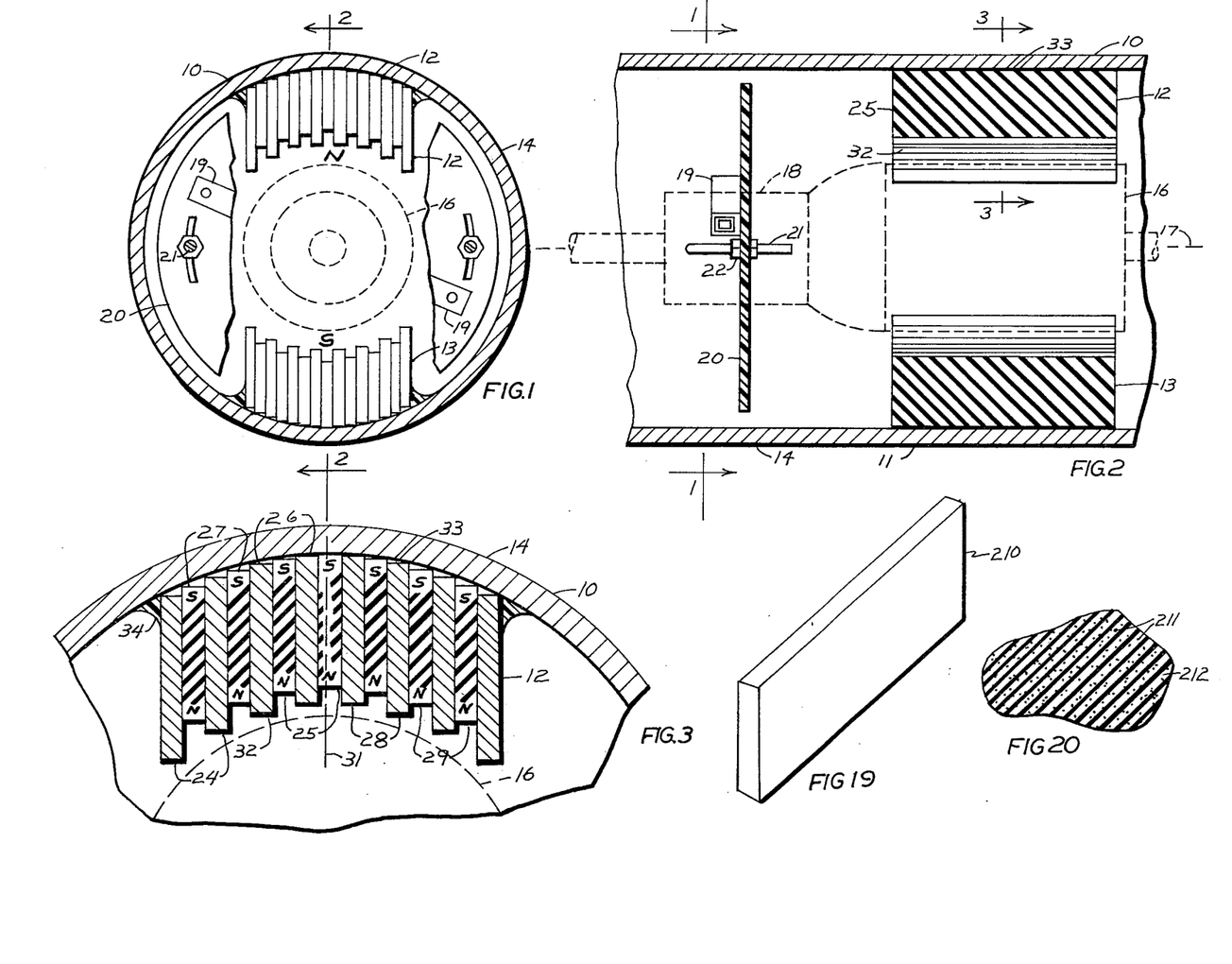
FIGS. 1–3 illustrate one embodiment of the invention with FIG. 1 being a transverse section along the lines 1—1 of a DC motor shown in FIG. 2, certain parts being broken away and others shown in broken lines, FIG. 2 being a longitudinal section taken generally along the lines 2—2 of FIG. 1 with certain parts being broken away and others shown in broken lines, and FIG. 3 being an enlarged section through one of the compound field magnets as generally seen along the lines 3—3 of FIG. 2.
FIG. 19 is an isometric view showing a form of a flexible magnetic component that may be used in assembling certain of the compound magnets and FIG. 20 shows a fragment of the magnet as seen in sectional to generally illustrate the composition of the magnetic components.

FIGS. 19 and 20 generally illustrate one form of flexible magnetic component, the component being designated at 210 and comprising as seen in FIG. 20 particles of barium ferrite 211 that are dispersed and embedded in a matrix 212 of cured rubber. In the conventional manufacturing procedures, the particles 211 are subjected to a magnetic field during the curing process for the matrix material and which in theory orients the particles in the desired polar axis direction. After curing the component may be demagnetized by well known procedures to facilitate cutting and machining of the magnets if desired and thereafter again subjected to magnetification along the polar axis for the contemplated end use.

The compound magnetic structures advocated in accord with the invention comprise a plurality of thin, preferably flat, flexible magnets that are arranged in the compound magnet in a face-to-face arrangement that provides a laminated structure. In some embodiments the flexible magnetic components are arranged so that the faces are contiguous while in other embodiments the flexible magnets are spaced apart by thin, preferably flat, metal spacers that are made from ferromagnetic material having a high permeability such as steel or other suitable material.

In general, the use of the flexible magnetic components in the laminated structures has certain advantages. For one, the thin magnets and which are preferably less than one fourth of an inch thick are capable of retaining a higher residual induction than thicker components subjected to the same field intensities during manufacture. Secondly, they can be cut to the desired shape for the laminate by steel rule die and other well known simple cutting procedures and may also be extruded in more complicated forms as for example in wedge shaped forms where such is desired in the laminated structures. Thirdly, the flexible magnets may be flexed and bent to provide compound magnets of various shapes that facilitate the more economical manufacture of the assembled motors by minimizing the machine costs associated with the shaping of more conventional magnets and with the manufacture of pole pieces and other components used for orienting the magnetic field for the magnetic circuit used in such motors.

As previously indicated, the invention contemplates laminated structures in which the flexible magnets may be either edge polarized or facially polarized. In the edge polarized arrangements for the laminated structures the metal layers or laminations serve to collapse the fields of the adjacent flexible magnets so that a more intense magnetic field can be realized at the resultant poles of the compound magnet than when the metal spacers are omitted. The thickness of the spacers in the laminated structures utilizing the edge polarized magnetic components are preferably such that they operate at near saturation in the magnetic circuit contemplated for the compound magnet so as to maintain a relatively close spacing between the faces of the magnets and hence realize a maximum flux density at the resultant poles of the laminated structure.

In the laminated structures utilizing the facially polarized flexible magnets the metal spacers also serve to collapse and orient the fields of the flexible magnets so that more intense magnetic fields can be realized at the resulting poles of the laminated structures. In the laminated structures utilizing the facially polarized thin, flexible magnets it has been generally found that the field intensities at the resulting poles of the laminated structure may reflect a near algebraic summation of the field intensities of the flexible magnets used in the structure up to the point at which the intensity exceeds that at which the materials of the thin magnets become saturated.

The various aspects of the invention will be more evident from a reference to the embodiments shown in the accompanying drawings.

Reference is first made to the embodiment of the invention illustrated in FIGS. 1–3 and wherein a two pole DC motor 10 is illustrated as having a stator 11 that includes a pair of compound field magnets 12 and 13 that establish the two resultant poles of the motor 10. The field magnets embody flexible magnetic components which are edge polarized and are mounted at diametrically opposite sides of a hollow cylindrical motor casing 14. Casing 14 is made of steel or other suitable ferromagnetic material having a high permeability so that the casing 14 serves as a yoke which couples and interconnects the permanent fields of the compound magnetic assemblies 12 and 13 in the magnetic circuit for the motor.

The armatures 16 is suitably mounted at the opposite ends of the casing by conventional means not shown but which establishes an axis for armature rotation that is designated at 17. The armature embodies conventional design features well known in the art and has a commutator 18 that is wiped by brushes which are mounted in brush housings 19. The housings 19 are appropriately mounted in the casing on a circular disk-like support 20 that is suspended in the casing from a pair of longitudinally extending threaded rods 21 that extend through arcuate slots in the circular support 20. The rods are equipped with nuts 22 which serve to clamp the circular support in place while nevertheless permitting adjustable orientation of the brushes with respect to the armature.

The compound field magnet 12 and 13, as is evident from the drawings, are radially offset from the axis 17 and each has a permanent magnetic field that is modified and linked through the casing with the other magnetic field in the overall magnetic circuit established by the arrangment. The laminated structure of the field magnets 12 and 13 is best illustrated by reference to the assembled field magnet 12 as seen in FIGS. 2 and 3. Field magnet 12 comprises in this embodiment a plurality of thin, flat, rectangular metal pieces 24 that are spaced apart in the laminated structure of the field magnet 12 and serve as spacers for a plurality of thin, flat, rectangular, flexible magnets 25 which are interposed and arranged in the spaces between the metal pieces 24. This provides a layered arrangement in which the flat metal spacers 24 and flexible magnets 25 are alternately arranged n a face-to-face arrangement and in which the spacers and magnets form the respective layers of the laminated sructure. The layers may be secured together in the arrangement as by suitable adhesive material at the confronting faces of the layers or by other suitable means. In the embodiment illustrated, each compound magnet is arranged in the motor structure so that the component layers of the laminated structure lie in respective planes that are parallel to each other and to the axis 17 of rotation for the armature 16. This orientation permits the use of simple rectangular structures in the layer make up of the compound magnet while nevertheless permitting a contour at the pole sides 32 and 33 of the compound magnet which generally conform to the contours of the casing and armature.

As best seen in FIG. 3, the upper edges 26 and 27 of the spacers 24 and flexible magnets 25 are arranged at the casing side 33 of the magnetic assembly 12 so that they are contiguous with the yoke forming casing 14 while, at the air gap area between the armature 16 and field magnet 12 the opposite edges 28 and 29 of the spacers 24 and magnets 25 are offset from each other. Thus at the air gap side 32 of the assembled magnet, the lower edges 28 of the spacers 24 are offset toward the armature from the lower edges 29 of the flexible magnets 25 that are next adjacent thereto in the laminated structure. Collectively the edge portions of the spacers at the armature side of the assembly provide a pole piece for the motor which uniformly distributes the flux in the magnetic circuit of the motor and tends to minimize edge affects well known in the art. In general it has been found that the edge of the spacers should be offset from the adjacent edges of the flexible magnet in the laminated structure by a distance amounting to from about 75 percent to 125 percent of the thickness of the flexible magnet at the gap area in order to secure the most affective results.

Each of the flexible magnets 25 in the illustrated embodiment is edge polarized as seen in FIG. 3 so that the polar axis 31 for each flexible magnet 25 in the assembly extends through the opposite edges 27 and 29 of the magnetic layer of the structure. The flexible magnets are further arranged in the compound magnet as seen in FIG. 3, in a complementing arrangement in which like magnetic poles of each flexible magnetic component 25 are located at the same arcuate side of the laminated structure. Thus, the north poles of each magnet 25 are located at the air gap side 32 of the laminated structure while the south poles of these magnets 25 are located at the casing side 33 of the structure. This provides a resultant north pole for the compound magnet at the air gap side 32 (see FIG. 1) and a resultant south pole for the magnetic structure 12 at the casing side 33. Here the field magnet 12 is secured to the casing by means of hardened plastic material which is designated at 34 in the illustrated embodiment although other means may, of course, be used for this purpose.

Field magnet 13 is similarly constructed and arranged in the motor assembly except that the magnetic poles of the flexible magnetic layers of the compound magnet 13 are reversed so as to provide, as seen in FIG. 1, a resultant south pole at the gap area side of the magnet. The resultant north pole for field magnet 13 is of course at the casing side of the magnet and the two compound magnets 12 and 13 are linked together by the casing in the overall magnetic circuit of the motor.

Apart from the improves field intensities realized by the laminated arrangements for the compound magnets, the embodiment shown in FIGS. 1–3 has the advantage that the shape of the magnetic structure and pole pieces can be realized through the use of simple rectangular components that can be readily stamped out and assembled by routine manufacturing procedures.

Figure 4:
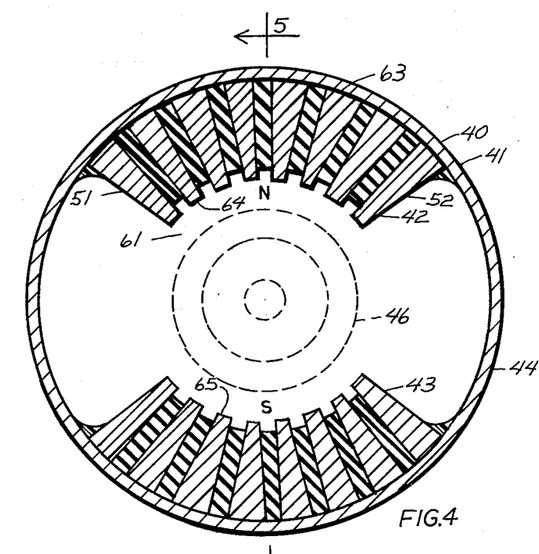
FIG. 4 being a transverse section along the lines 4—4 of a DC motor shown in FIG. 5, certain parts being broken away and others shown in broken lines, FIG. 5 being a longitudinal section along the lines 5—5 of FIG. 4, with certain parts broken away or removed and others shown in broken lines, and FIG. 6 being an enlarged transverse sectional view through one of the compound field magnets as generally seen along the lines 6—6 of FIG. 5.
Figure 5:
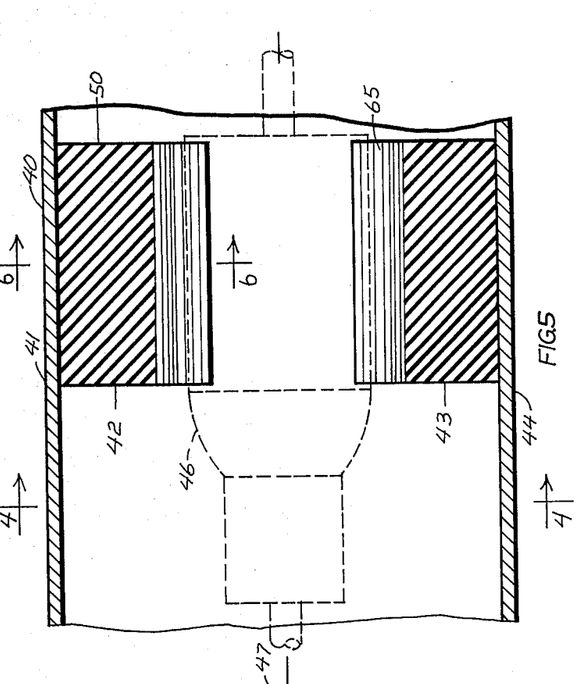
Figure 6:
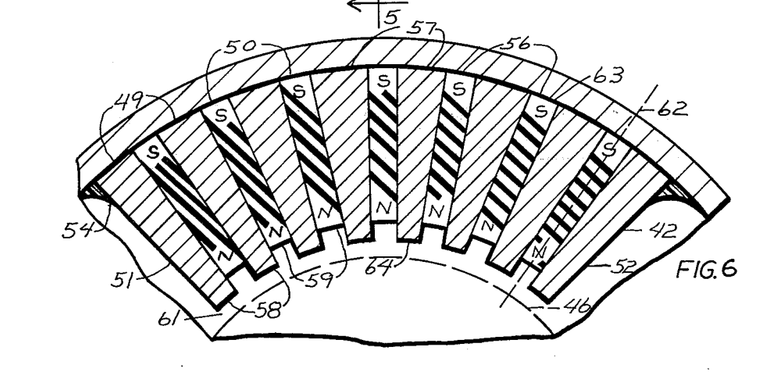

The improved field intensities derived through the use of the laminated structures may be realized in motor field magnets that are somewhat more complicated in structure than illustrated in the embodiment shown in FIGS. 1–3 and the embodiment shown in FIGS. 4–6 illustrates one such arrangement. Here a two pole DC motor 40 is seen as having a stator 41 that includes a pair of compound field magnets 42 and 43. These magnets 42 and 43 are radially offset from the axis 47 of rotation for the armature 46 and are mounted at diametrically opposite sides of a hollow cylindrical motor casing 44. The casing is preferably made of steel or other highly permeable ferromagnetic material so as to serve as a yoke that couples the magnetic structures 42 and 43 together in the magnetic circuit for the motor.

The armature is mounted at the opposite ends of the casing by means not shown, and the brush assembly and supporting structure therefore are omitted from the drawings since like the armature, these motor components may embody conventional design principles that are well known in the art.

The laminated structure of the field magnets 42 and 43 is best seen by reference to FIGS. 5 and 6 and to the laminated structure of the field magnet 42 shown therein. In this case the compound magnet 42 includes a plurality of thin, flat, rectangular, flexible magnets 50 which are spaced apart in the laminated structure by a plurality of thin, rectangular metal spacers 49 that are interposed between the flexible magnets 50 and located in the spaces therebetween. The spacers 49 are, of course, made of highly permeable ferromagnetic material such as steel and again serve to collapse the respective fields of the magnetic components of the structure 42 to intensify the field in the gap area.

The spacers 49 in this instance are wedge shaped in cross section and have a tapering thickness dimension that diminishes radially in the direction of the armature. The wedge shaped structure of these spacers facilitates a face-to-face arrangement between the thin layers of the laminated structure and in an arrangement where each layer falls in a plane that is radially oriented with respect to the armature axis 47 and intersects the planes in which the other layers are oriented along the axis. The wedge shaped metal pieces further facilitate the provision of a laminated structure which between the opposite ends 51 and 52 of the compound field magnet are generally arcuately contoured along the casing and air gap sides 63 and 64 of the laminated structure. The layers of the laminated structure may be fixed together in the face-to-face arrangement as by means of suitable adhesive material and in the illustration the magnetic structure 42 is secured to the inner wall of the casing as by means of a suitably hardened plastic material designated at 54.

The radial arrangement of the magnetic and spacer layers tends to focus and concentrate the lines of flux in the armature area to a greater extent than the embodiment shown in FIG. 1.

In the arrangement illustrated the upper edges 56 and 57 of the flexible and rigid layers 49 and 50 are contiguous with the inner wall of the metal casing 44 while the opposite edges 58 and 59 of the spacers and magnets 49 and 50 are arranged at the air gap side 64 in a radially offset manner such that the edges 58 of the metal spacers are offset toward the armature in the gap area 61 from the edges 59 of the flexible magnets that are next adjacent thereto in the laminated magnetic structure.

As in the previous embodiment, each magnetic component 50 of the compound field magnet 42 is edge polarized so that the polar axis 62 of each magnet extends between its opposite edges 56 and 59. The magnets are further oriented in the laminated structure in a complementing manner such that like poles of each magnetic component 50 are located at the same side of the laminated structure 42. Thus the south poles at the upper edges 56 of the magnets 50 are located at the casing side 63 while the north poles at the lower edges 59 are located at the air gap side 64 of the laminated structure. This arrangement provides a resultant north pole as seen in FIG. 4 for the compound field magnet 42 and which is located adjacent the armature 46.

The compound field magnet 43 is similarly constructed and mounted in the assembled motor except that the pole arrangement of the magnetic components is reversed so that at the air gap side 65 of the laminated structure 43 the structure provides a resultant south pole again seen in FIG. 4.

Apart from the improved field intensities realized through the use of the laminated structures the embodiment shown in FIGS. 4–6 has the advantage that the magnetic field is focused into an area at which a greater number of the lines of flux are cut by perpendicular movement of the armature conductors. To avoid the machining costs associated with the manufacture of the wedge shaped metal spacers, thin, flat spacers may be employed in conjunction with thin, flexible magnets that are wedge shape. The latter may be formed by well known extrusion techniquies during the manufacture of the flexible magnets.

Figure 7:
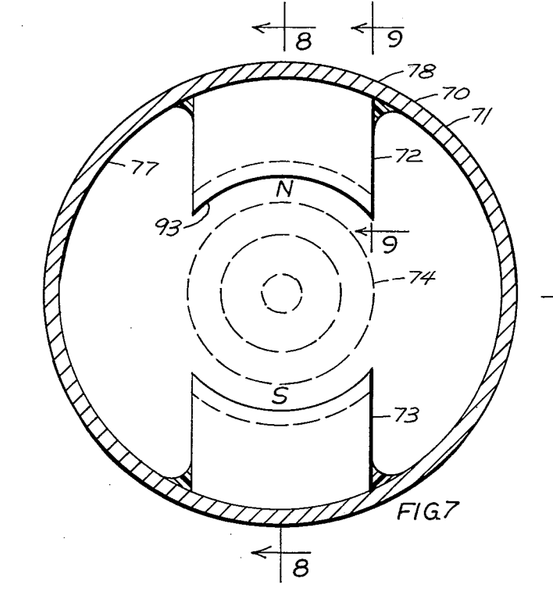
FIG. 7 being a transverse sectional view along the lines 7—7 of the motor shown in FIG. 8, certain parts being broken away or removed and others shown in broken lines, FIG. 8 being a longitudinal section along the lines 8—8 of FIG. 7 with certain parts removed or broken away and others shown in broken lines, and FIG. 9 being an enlarged section generally along the lines 9—9 of FIG. 7.
Figure 8:
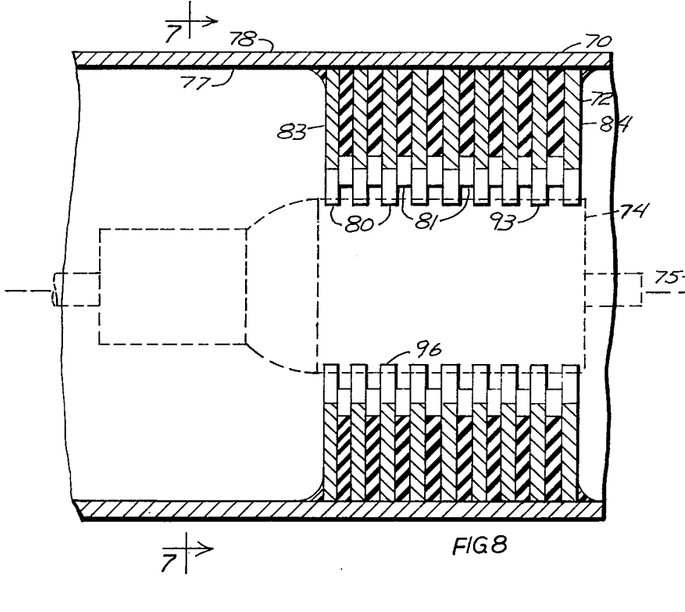
Figures 9, 12:
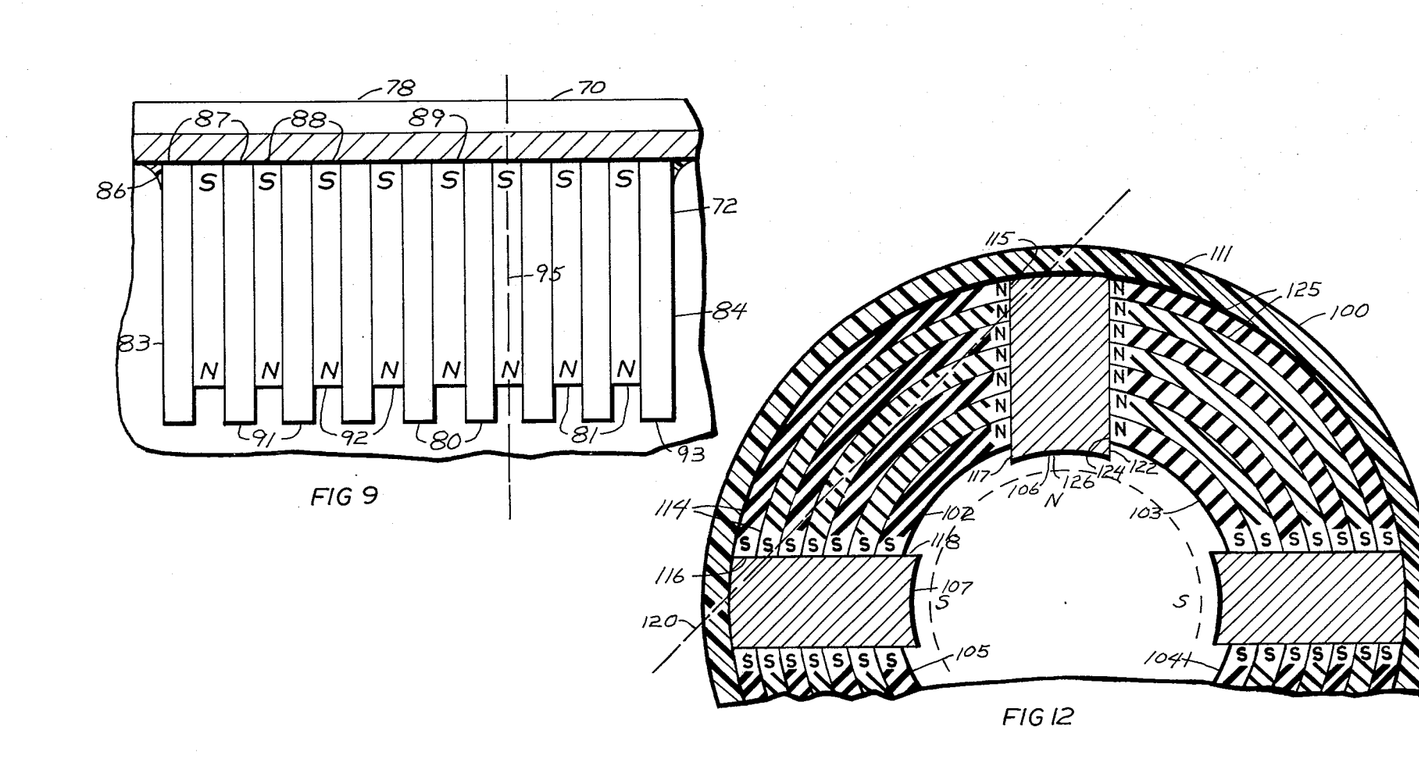

Reference is now made to the embodiment of the invention shown in FIGS. 7–9 and wherein there is shown another two pole DC motor 70 that has a stator 71 which is equipped with a pair of compound field magnets 72 and 73. Like the previously described embodiments, these laminated structural components of the motor utilize edge polarized flexible magnets in the layered structure. The armature 74 is mounted at the opposite ends of a hollow cylindrical casing by means not shown but which provides for its rotation about an axis that is designated at 75. The field magnets 72 and 73 are offset from the axis 75 in the assembled motor and are secured at diametrically opposite sides of the inner wall 77 of the casing 78. The casing 78 is preferably made of steel or other highly permeable ferromagnetic materials so as to serve as a yoke that links the permanent magnetic fields of each magnet 72 and 73 into the magnetic circuit of the motor. The brush assembly and its supporting structure are not shown in the drawing but like the armature may embody conventional design principles which are well known to those skilled in the art.

The structure of the compound field magnets is best seen by reference to FIGS. 8 and 9 and to the structure of the compound field magnet 72 shown therein. In this instance the magnet 72 comprises a plurality of thin, flat, metal spacers 80 which are made of a highly permeable ferromagnetic material such as steel and spaced apart between the opposite ends 83 and 84 of the laminated structure by a plurality of thin, flat, flexible magnets 81 which are interposed in the layered arrangement and located in the spaces between the spacers 80. The layers of the magnet are secured together in a face-to-face arrangement by means of suitable adhesive material as in the previously described embodiments although other suitable means may be obviously employed. The laminated magnetic assembly 72 is secured to the cylindrical casing 78 by means of a hardened plastic material designated at 86.

In this instance the opposite edges of the layers are arcuately contoured and the magnet 72 is mounted in a manner such that the layers fall in parallel planes that are normal to the axis 75 of rotation for the armature 74. The upper arcuate edges 87 and 88 of the spacers and magnetic components 80 and 81 of the field magnet 72 are arranged in the laminated structure so that at the casing side 89 of the magnet 72 they are contiguous with the inner wall 77 of the casing 78. On the other hand, at the air gap side 93 of the magnet, the opposite edges 91 and 92 of the spacers and magnets 80 and 81 respectively are arranged in an offset manner such that the edges 91 of the spacers are offset toward the armature 74 from the edges 92 of the magnets 81 that are next adjacent thereto in the laminated magnetic structure. The offset edge spacing in this, as well as the previously described embodiment, is comparable to that contemplated in the embodiment shown in FIGS. 1–3.

The flexible magnets 81 in this instance are also edge polarized so that the polar axis 95 of each magnet 81 extends between the opposite edges 88 and 92 of the flexible component and in a field complimenting arrangement in which the edges having like magnetic poles are located at the same sides of the laminated structure of the magnet 72. Thus, as seen in FIG. 9, the south poles of the flexible magnetic components 81 for field magnet 72 are located at the casing side 89 while the north poles are located at the air gap side 93 of the laminated structure. This provides, as seen in FIG. 7, a resultant north pole at the armature side 93 of magnet 72.

Field magnet 73 is similarly constructed except that the polar arrangement for the flexible magnets is reversed to provide, as seen in FIG. 7, a resultant south pole at the armature side 96 of the laminated structure 73. Apart from the improved flux desity characteristics derived through use of the laminated structure the arrangement utilized in the embodiment shown in FIGS. 7–9 has the advantage that the components of the laminated structure may be formed by simple stamping and die cutting procedures and also assembled in the motor by conventional manufacturing procedures. The arcuate edges of the spacers at the air gap sides of the magnets further serve to focus and concentrate the flux in the armature area.

Figure 10:
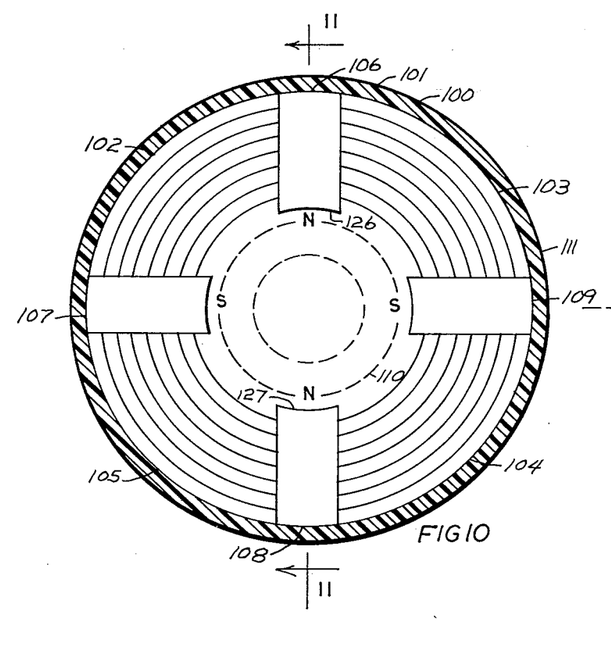
FIG. 10 being a transverse section along the lines 10—10 of the DC motor shown in FIG. 11, with certain parts removed or broken away and others illustrated in broken lines, FIG. 11 being a longitudianl sectional view along the lines 11—11 of FIG. 10 with certain parts shown in broken lines and other parts removed or broken away, and FIG. 12 being an enlarged transverse sectional view showing a fragment of the motor along the lines 12—12 of FIG. 11.
Figure 11:
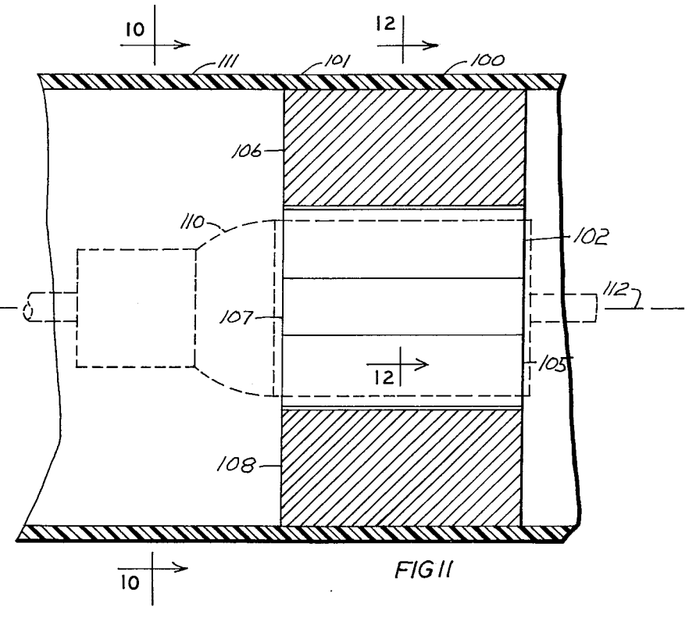

Yet another embodiment of the invention wherein edge polarized flexible components are used in the laminated structure of the compound magnets is seen in FIGS. 10–12 and wherein a four pole DC motor 100 is illustrated as having a stator 101 that is equipped with four compound field magnet assemblies designated at 102, 103, 104 and 105. Each of the field magnets 102–105 inclusive has a permanent field and these fields are oriented in the magnetic circuit for the motor by means of four pole pieces 106, 107, 108 and 109 that are offset from the armature axis and located in the space between the circumferentially spaced magnet assemblies 102–105. The armature 110 is mounted at the opposite ends of a hollow cylindrical motor casing 111 by means not shown but which provides for rotation of the armature about an axis designated at 112. The brush assembly and supporting structure are not shown in the drawings but like the armature may involve conventional design principles well known in the art.

The structure of the compound field magnets 102–105 and their orientation in the assembled motor 100 is best illustrated by reference to FIGS. 11 and 12 and to the laminated structure of magnet 102 and its relationship to the pole pieces 106 and 107.

In this instance, the laminated structure comprises a plurality of thin, flat, rectangular, flexible magnets 114 that are assembled in a face-to-face arrangement in the laminated structure. The magnetic components 114 are here arcuately bent and suitably secured together as by adhesive means not shown so as to take on an arcuate facial contour with respect to the axis 112 of rotation for the armature. In the assembled motor, the opposite edges 115 and 116 of the flexible magnetic components forming the layered structure of magnetic component 102 abut and are contiguous with the adjacent sides 117 and 118 of the spaced pole pieces 106 and 107 respectively.

The magnetic components 114 in this instance are also edge polarized so that the polar axis 120 of each magnet extends through the opposite edges 115 and 116 thereof. As seen in FIG. 1, the poles of each magnetic component 114 in the laminated structure 102 are arranged in a complementing manner with the edges having like magnetic poles being contiguous to the same side of the adjacent pole piece.

The laminated layered structure of the field magnets 103, 104 and 105 is similar to that of magnet 102. However, in the assembled motor, the magnets 102 through 105 inclusive are circumferentially spaced apart by the pole pieces 106–109 and in an arrangement such that the opposite sides of each pole piece are contiguous to and abutted by the edges of the spaced laminated structures which have like magnetic poles. Thus side 117 of pole piece 106 abuts the edges 115 at the north poles of the flexible magnetic component forming the layers of magnet 102 while at the opposite side 122, the pole piece 106 abuts the edges 124 of the flexible components 125 that make up the structure of field magnet 103. This arrangement provides for a resultant north pole at the pole face 126 of pole piece 106 and a resultant north pole at the pole face 127 of pole piece 108. On the other hand, the arrangement provides for a resultant south pole at the pole faces of each of pole pieces 107 and 109 respectively.

The casing 111 is preferably made of plastic material to avoid short circuiting the flux path. Apart from the more intense magnetic fields derived from the laminated structures, the embodiment illustrated in FIGS. 10–12 has the advantage that the arcuate contour of the compound magnet can be realized without the need for machining metal components by simply bending the flexible magnetic layers to the desired contour before they are secured together in the laminated structure.

Figure 13:
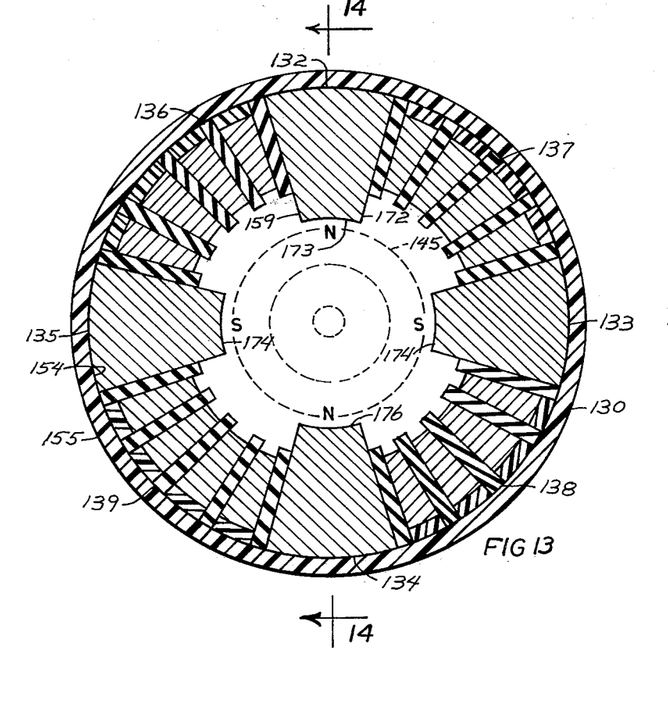
FIG. 13 being a transverse sectional view taken generally along the lines 13-13 of a DC motor shown in FIG. 14, certain parts being removed or broken away and others shown in broken lines, FIG. 14 being a longitudinal sectional view along the lines 14—14 of FIG. 13 with certain parts broken away or removed and other parts shown in broken lines, and FIG. 15 being an enlarged view through a fragment of the motor as seen along the lines 15—15 of FIG. 14.
Figure 14:
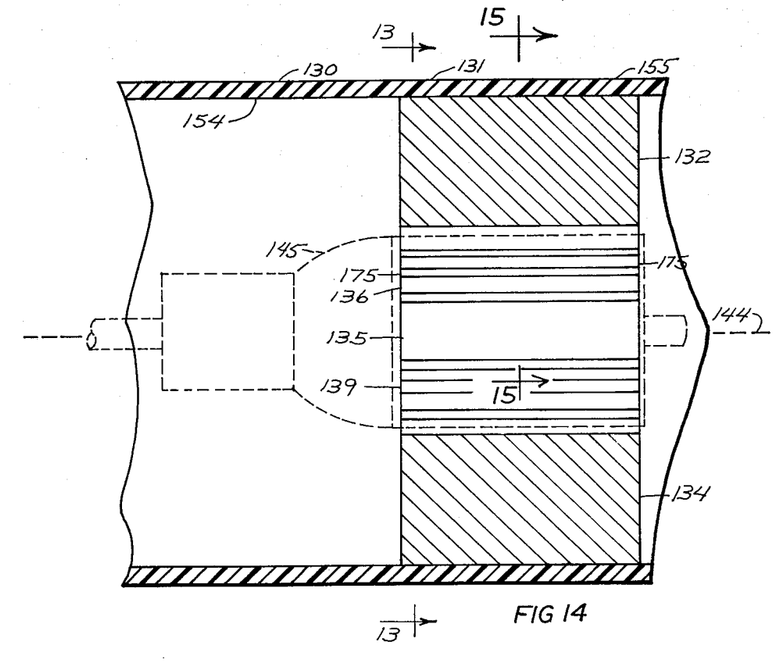
Figure 15:
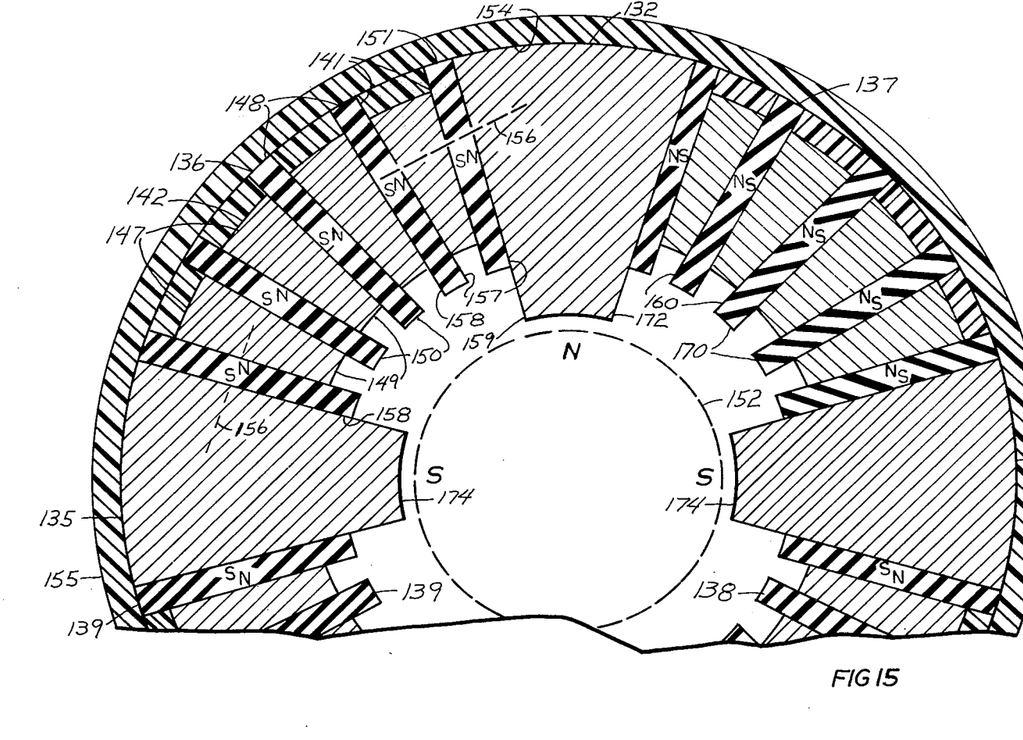

The principles of the invention may also be embodied in motor field magnet assemblies in which the thin, flexible magnetic components are facially polarized and in this respect reference is made to the embodiment shown in FIGS. 13–15 and to the four pole DC motor 130 illustrated therein. In this instance, the stator 131 is equipped with four circumferentially spaced wedge shaped pole pieces 132, 133, 134 and 135 and four compound field magnets 136–139 inclusive which are spaced apart and interposed between the circumferentially spaced pole pieces. The motor 130 illustrated has an armature 145 that is mounted by means not shown at the opposite ends of a hollow cylindrical casing 155. The brush assembly and supporting structure is not shown in the illustration but like the armature may embody conventional design principles well known to those skilled in the art.

The structure of the field magnets 136–139 and their relationship to the pole pieces 132–135 is best illustrated by reference to FIGS. 14 and 15 and to the laminated structure and arrangement of field magnet 136. In this instance, field magnet 136 comprises a plurality of thin, flat, rectangular, flexible magnetic components 141 which are arcuately spaced apart in the assembly and a plurality of thin, rectangular metal spacers 142 that are interposed and located in the spaces between the flexible magnetic components 141. The magnetic components 141 and metal spacers 142 are assembled in a face-to-face layer arrangement as in previously illustrated embodiments, and the metal layers 142 of the laminated structure are wedge shaped with a tapering thickness dimension that diminishes in the direction of the axis 144 of rotation for the armature 145. This tapering arrangement for the metal spacers facilitates an arrangement for the magnetic layers 141 which is such that each of the metal and magnetic layers lies in a plane that is radially oriented with respect to the axis 144 and intersects the planes of the other layers along this axis.

Like previously described embodiments, the metal spacers 142 are made from highly permeable ferromagnetic material such as steel. However in this instance the outer and inner edges 147 and 149 of the metal spacers 142 are inwardly offset in the laminated structure from the opposite edges 148 and 150 of the flexible magnetic components. This inwardly offset arrangement of the edges of the metal spacers 142 also prevails at the opposite ends 175 of the compound field magnet 136. The spacers in this instance again serve to collapse the fields of the magnetic components of the laminated structure and the inwardly offset arrangement for the spacer edges serves to minimize spurious field circuits in the edge offset areas of the compound structure. As assembled in the motor structure the magnetic components 141 of the field magnet 136 are contiguous with the inner wall 154 of the casing 155 along the casing side 151 of the field magnet 136. The outer edges 147 of the metal spaces however are offset from the casing wall 154 and in this instance the casing is made of low permeable material such as aluminum or preferably plastic material so as to avoid a short circuit between the magnetic components of the compound magnet and between the respective pole pieces separated thereby. Similarly, at the armature side 152 of the laminated structure of the magnet 136, the edges 149 of the spacers are inset from the edges 150 of the magnetic components 141.

As previously indicated, the flexible magnets 141 are facially polarized in this embodiment so that the polar axis 156 of each flexible magnetic component 141 extends through the opposite faces 157 and 158 of the magnetic component. This provides an arrangement where the magnetic poles are located at the opposite faces 157 and 158 of each magnet 141. The magnetic components 141 are further oriented in the laminated structure in a complementing arrangement so that like poles of each magnetic component 141 face in the same arcuate direction in the assembled structure as is best seen in FIG. 15.

The structure of the other field magnets is similar to that shown for field magnet 136. However the flexible magnetic components of the laminated structures at the opposite sides of each pole piece are arranged so that like poles in the magnetic components of the spaced magnets face the adjacent sides of the separating pole piece in the arcuate arrangement. Thus the northern polarized faces 157 of the flexible magnetic components 141 of magnet 136 generally face the adjacent side 159 of pole piece 132 while the northern polarized faces 160 of the flexible magnetic components 170 of compound field magnet 137 generally face the opposite side 172 of this pole piece 132. This provides a complementing arrangement between the spaced field magnets 136 and 137 and establishes a resultant north pole at the pole face 173 of pole piece 132 while the complementing arrangement between the laminated field magnets 137 and 138 and between the field magnets 136 and 139 establishes resultant south poles at the pole faces 174 for pole pieces 133 and 135. Similarly, the complementing arrangement of the flexible magnetic components in laminated field magnets 138 and 139 establishes a resultant north pole at the pole face 176 of pole piece 134.

Apart from the improved field intensities attributable to the laminated arrangement of the compound field magnets the arrangements shown in FIGS. 13–15 have the advantage that a simple arcuate arrangement for a magnetic assembly can be realized without the need for special machining of premagnetized metallic material. To avoid the machine costs for the spacers, the spacers may be stamped from flat material and the flexible magnets may be extruded in a wedge shape.

Figure 16:
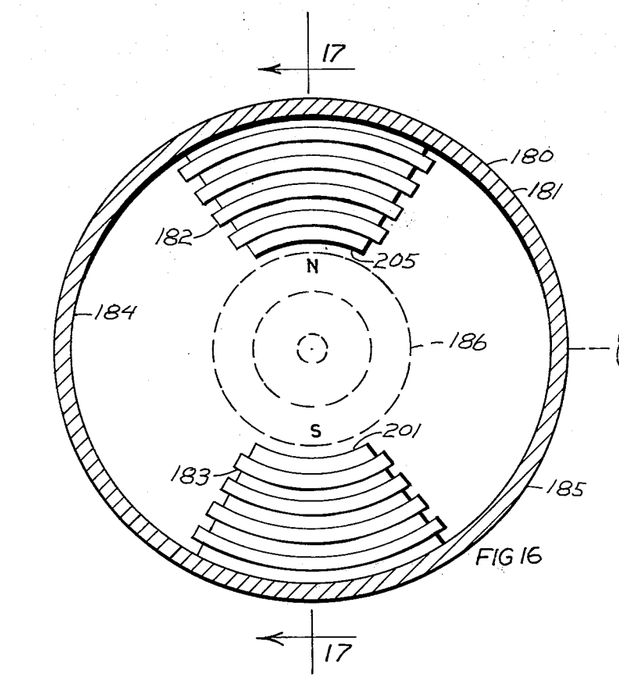
FIG. 16 being a transverse sectional view taken generally along the lines 16—16 of the DC motor shown in FIG. 17, with certain parts being removed or broken away and others shown in broken lines, FIG. 17 being a longitudinal sectional view taken generally along the lines 17—17 of FIG. 16, with certain parts broken away or removed and others shown in broken lines, and FIG. 18 being an enlarged sectional view taken generally along the lines 18—18 of FIG. 17.
Figure 17:
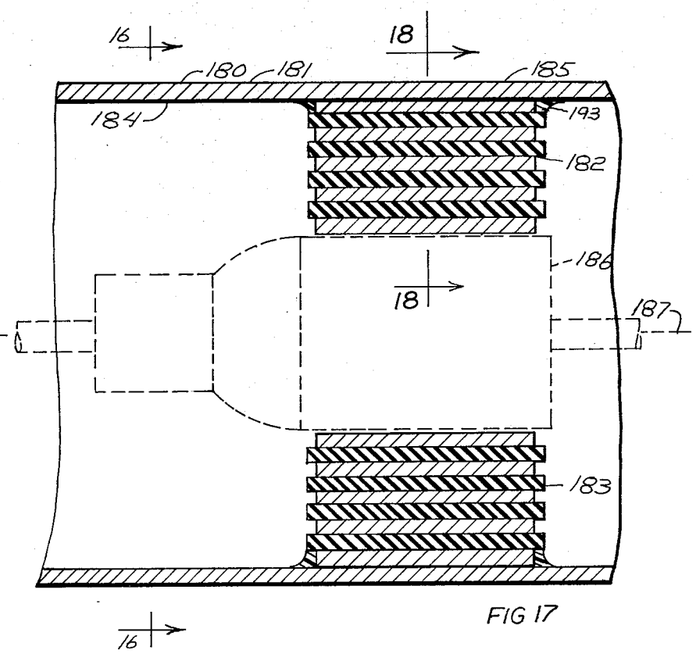
Figure 18:
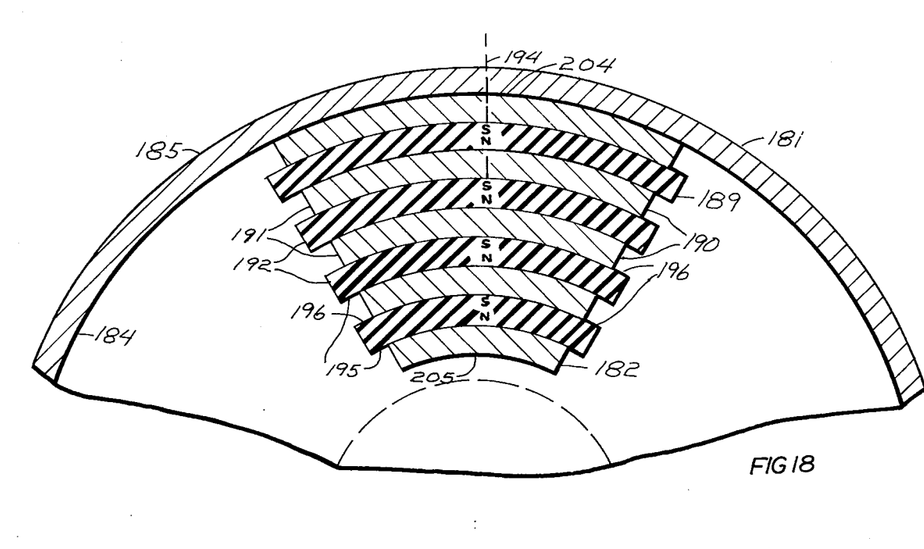

Yet another arrangement in which the flexible magnetic components of a motor field magnet are facially polarized is seen in FIGS. 16–18. In this instance a two pole DC motor 180 is shown as having a stator 181 that is equipped with a pair of compound field magnets designated at 182 and 183. The armature 186 of the motor is mounted at the opposite ends of a hollow cylindrical casing 185 by means not shown but which establishes an axis for rotation of the armature that is designated at 187. The brush assembly and supporting structure for it are not shown in the drawings but like the armature may involve conventional design principles well known in the art.

The field magnets 182 and 183 are offset from the axis 187 and are mounted on the inner wall 184 of the casing 185 at diametrically opposite sides of the motor casing. The casing in this instance is made of highly permeable ferromagnetic material such as steel to provide a yoke that interconnects the permanent magnetic field of the magnetic assemblies 182 and 183 in the magnetic circuit of the motor.

The laminated structure of the field magnets 182 and 183 is best seen in FIGS. 17 and 18 by reference to the structure of field magnet 182. Magnet 182 comprises a plurality of thin, flat, rectangular, flexible magnetic components 189 which are spaced apart in the laminated structure by a plurality of thin, flat, rectangular metal spacers 190 that are interposed in the spaces between the flexible layers 189. The metal spacers in this embodiment are also made from highly permeable ferromagnetic material such as steel and in this instance the layers 189 and 190 of the laminated structure 182 are bent to assume arcuate contours with respect to the axis 187 and are secured in a face-to-face arrangement by suitable adhesive material or other means not shown.

In the laminated structure of the magnet 182 the edges 191 of the metal spacers are offset inwardly from the adjacent edges 192 of the magnetic component 189. As in the previously described embodiment, this arrangement serves to collapse the field of the respective magnetic components of the laminated structure and to minimize spurious field losses at the edges at the structure. As seen in FIG. 18, the width dimensions of the layers 189 and 190 progressively diminish from the casing side 204 to the armature side 205 of the compound magnet 182. This arrangement serves to focus and concentrate the lines of flux in the area of perpendicular movement of the armature winding in a simple and efficient manner.

The magnetic components 189 of the compound magnet 182 as previously indicated are facially polarized so that the polar axis 194 of each magnetic component extends between the opposite faces 195 and 196 of the magnets. The magnetic components are also arranged in a pole complementing arrangement so that like magnetic poles, as seen in FIG. 18, face in the same radial direction in the laminated structure. Thus the northern polarized faces 195 of the magnetic layers 189 face in the direction of the axis 187 while the southern polarized faces 196 face the inner wall 184 of the motor casing 185. This arrangement establishes a resultant north pole (seen in FIG. 16) at the armature side 205 of the compound magnet 182.

The structure of the other compound field magnet 183 is similar to that of field magnet 182 except that the polarized arrangement is reversed so that the resultant southern pole of the laminated structure 183 is established at the armature side 201 of the laminated structure 183. The magnetic assemblies are secured to the inner wall 184 of the casing 185 by means of hardened plastic material 193.

Apart from the improved field intensities derived through the use of the laminated structures, the arrangement seen in FIGS. 16–18 provides an efficient and economical means for providing a magnetic circuit in which the field is focused without the need for machining metal structures to accomplish the result.

From the foregoing description it is evident that the improved magnetic structures may be employed in AC as well as DC motor applications.

I claim:

1. An electric motor having a compound field magnet with a permanent magnetic field, said magnet being a laminated structure that includes thin layers which are assembled in a face-to-face arrangement and comprise flexible layers that have permanently magnetized particles which are embedded in a matrix of flexible material and ferromagnetic metal layers respectively interposed between said flexible layers, each of said flexible layers having a thickness dimension which is less than about one-fourth of an inch, and said metal layers having a higher permeability than said flexible layers.

2. An electric motor in accord with claim 1 where each of said flexible layers has opposite edges and the embedded particles in each flexible layer are polarized to provide a polar axis that extends between the opposite edges thereof and in a pole complementing arrangement with respect to the other flexible layers of the compound field magnet.

3. An electric motor in accord with claim 1 where each of said flexible layers has opposite faces and the embedded particles in each flexible layer are polarized to provide a polar axis that extends between the opposite faces thereof and in a pole complementing arrangement with respect to the other flexible layers of the compound field magnet.

4. An electric motor in accord with claim 1 where said particles are barium ferrite.

5. An electric motor having an armature which is rotatable about an axis, and a compound field magnet which is radially offset from the axis and has a permanent magnetic field, said magnet being a laminated structure that includes thin, flat layers which are assembled in a face-to-face arrangement in respective parallel planes that are parallel to said axis, said flat layers comprising ferromagnetic metal layers which are spaced apart, and flexible layers which are interposed and located in the respective spaces between said metal layers, each of said flexible layers having opposite edges and a flexible matrix containing material which is permanently magnetized to provide opposite magnetic poles respectively at said opposite edges, said armature and field magnet having an air gap therebetween, said flexible layers being so oriented that edges having like magnetic poles are located at said air gap, and each of said metal layers having an edge which is located at said air gap and which is offset toward the armature from the edges of the flexible layers next adjacent thereto in the laminated structure.

6. The electric motor in accord with claim 5 wherein said flixible matrix containing material comprises particulate barium ferrite.

7. An electric motor having an armature which is rotatable about an axis, and a compound field magnet which is radially offset from the axis and has a permanent magnetic field, said magnet being a laminated structure that includes thin layers which are assembled in a face-to-face arrangement in respective planes that intersect along and are radially oriented with respect to said axis, said thin layers comprising ferromagnetic metal layers which are spaced apart, and flexible layers which are interposed and located in the respective spaces between said metal layers, each of said flexible layers having opposite edges and a flexible matrix containing material which is permanently magnetized to provide opposite magnetic poles respectively at said opposite edges, said armature and field magnet having an air gap therebetween, said flexible layers being so oriented that edges having like magnetic poles are located at said air gap, and each of said metal layers having an edge which is located at said air gap and which is offset toward the armature from the edges of the flexible layers next adjacent thereto in the laminated magnetic structure.

8. The electric motor in accord with claim 7 wherein said flexible matrix containing material comprises particulate barium ferrite.

9. An electric motor having an armature which is rotatable about an axis, and a compound field magnet which is radially offset from the axis and has a permanent magnetic field, said magnet being a laminated structure that includes thin layers which are assembled in a face-to-face arrangement in respective parallel planes that are normal to said axis, said thin layers comprising ferromagnetic metal layers which are spaced apart, and flexible layers which are interposed and located in the respective spaces between said metal layers, each of said flexible layers having opposite edges and a flexible matrix containing material which is permanently magnetized to provide opposite magnetic poles respectively at said opposite edges, said armature and field magnet having an air gap therebetween, said flexible layers being so oriented that edges having like magnetic poles are located at said air gap, and each of said metal layers having an edge which is located at said air gap and which is offset toward the armature from the edges of the flexible layers next adjacent thereto in the laminated magnetic structure.

10. The electric motor in accord with claim 9 wherein said flexible matrix containing material comprises particulate barium ferrite.

11. An electric motor having an armature which is rotatable about an axis, a pole piece radially offset from said axis having a pole face and opposite sides radially outwardly of said pole face, and a pair of compound magnets which are spaced apart and respectively located at said opposite sides of said pole piece, each of said magnets having a laminated structure that includes thin layers which are assembled in a face-to-face arrangement in respective planes that intersect along and are radially oriented with respect to said axis, said thin layers comprising flexible layers which are spaced apart, and ferromagnetic metal layers which are interposed and located in the respective spaces between said flexible layers, each of said thin layers having opposite edges and the opposite edges of the metal layers being offset inwardly in the laminated structure from the opposite edges of the flexible layers next adjacent thereto, each of said flexible layers having opposite faces and a flexible matrix containing material which is permanently magnetized to provide opposite magnetic poles that are respectively located at said opposite faces, and the flexible layers in each of the laminated magnetic structures being so oriented that the faces having like poles generally face the ones of said opposite sides of the pole piece that are adjacent thereto.

12. The electric motor in accord with claim 11 wherein said flexible matrix containing material comprises particulate barium ferrite.

13. An electric motor having an armature which is rotatable about an axis, and a compound field magnet which is radially offset from the axis and has a permanent magnetic field, said magnet being a laminated structure that includes thin, flat layers which are arcuately arranged with respect to said axis and assembled in a face-to-face arrangement, said flat layers comprising paramagnetic metal layers which are spaced apart, and flexible layers which are interposed and located in the respective spaces between said metal layers, each of said flat layers having edges and the edges of the metal layers being offset inwardly in the laminated structure from the edges of the flexible layers next adjacent thereto, each of said flexible layers having opposite faces and a flexible matrix containing material which is permanently magnetized to provide opposite magnetic poles that are respectively located at said opposite faces, said flexible layers being so oriented that faces having like poles face in the same radial direction in the laminated structure.

14. The electric motor in accord with claim 13 wherein said flexible matrix containing material comprises particulate barium ferrite.

15. An electric motor having a compound field magnet with a permanent magnetic field, said magnet being a laminated structure that includes thin layers which are assembled in a face-to-face arrangement and comprise flexible layers, and ferromagnetic metal layers respectively interposed between said flexible layers, each of said flexible layers having opposite edges and a matrix of flexible material containing embedded permanently magnetized particles that are polarized to provide a polar axis which extends between said opposite edges and in a pole complementing arrangement with respect to the other flexible layers of the compound field magnet, each of said metal layers having an edge which is outwardly offset from the edges of the flexible layers next adjacent thereto in the laminated structure by a distance ranging from about seventy-five percent to one hundred twenty-five percent of the thickness of the respective flexible layers next adjacent thereto, each of said flexible layers having a thickness dimension which is less than about one-fourth of an inch, and each of said metal layers having a permeability which is higher than that of the flexible layers.

* * * * *